US009853731B2

(12) United States Patent
Maricevic et al.

(10) Patent No.: US 9,853,731 B2
(45) Date of Patent: Dec. 26, 2017

(54) SEGMENTABLE OPTICAL NODE MODULE CONFIGURABLE AS AN RF AMPLIFIER AND CORRESPONDING METHODS AND SYSTEMS

(71) Applicant: ARRIS Enterprises, Inc., Suwanee, GA (US)

(72) Inventors: Zoran Maricevic, West Hartford, CT (US); Charles Pifer, Bellefonte, PA (US); Ryan N. Rosensteel, Hatfield, PA (US); Jeffrey A. Boast, Colmar, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 476 days.

(21) Appl. No.: 14/453,603

(22) Filed: Aug. 6, 2014

(65) Prior Publication Data
US 2016/0043806 A1    Feb. 11, 2016

(51) Int. Cl.
*H04B 10/2575*    (2013.01)
(52) U.S. Cl.
CPC .............................. *H04B 10/25751* (2013.01)
(58) Field of Classification Search
CPC .......... H04B 10/2575; H04B 10/25751; H04B 10/25752
See application file for complete search history.

(56) References Cited

U.S. PATENT DOCUMENTS

| 7,089,012 | B2 | 8/2006 | Harris et al. |
| 7,721,317 | B2 | 5/2010 | Pavlic et al. |
| 8,451,833 | B2 | 5/2013 | Kolli et al. |
| 8,495,696 | B1 | 7/2013 | Pavlic et al. |
| 2002/0118425 | A1* | 8/2002 | Dove ..................... H04B 10/66 398/202 |
| 2006/0056011 | A1* | 3/2006 | Iizuka ................. H01S 3/06758 359/337 |
| 2013/0121636 | A1* | 5/2013 | Dove ....................... G02B 6/35 385/17 |

* cited by examiner

*Primary Examiner* — Ted Wang
(74) *Attorney, Agent, or Firm* — Lori Anne D. Swanson

(57) ABSTRACT

A module for a hybrid fiber coax network includes a quad-output amplifier module that can include a port to couple to upstream devices, four ports to couple to downstream devices, and a configured port. The configured port can optionally couple to one of a radio frequency (RF) pre-amplifier or one or more optical transmitter modules or receiver modules. The module is initially provided in a default configuration as an optical node module. However, it can be pre-configured as a RF amplifier. When the configured port is coupled to the one or more optical transmitter modules or receiver modules in the default configuration, the module is operable as an optical node module. When the configured port is coupled to the RF pre-amplifier, the module is transformed to be operable as an RF amplifier.

19 Claims, 15 Drawing Sheets

SEGMENTABLE OPTICAL NODE MODULE CONFIGURABLE AS AN RF AMPLIFIER AND CORRESPONDING METHODS AND SYSTEMS

BACKGROUND

Technical Field

This disclosure relates generally to devices for communication systems, and more particularly to communication devices for hybrid fiber coaxial ("coax") networks.

Background Art

Communications network providers are constantly improving their networks to provide users with greater bandwidth and improved service options. Not too long ago, for example, a cable network operator broadcast a one-size fits all video content offering to all users. This content offering was delivered in a single downstream direction over coax cables. Today, however, those same providers deliver interactive video, telephony services, high-speed data for Internet and World Wide Web communications and so forth. To deliver such services, the networks are required to be faster, of higher bandwidth, and more reliable. It would be advantageous to have modules that helped to more quickly implement faster, higher bandwidth, and more reliable network solutions.

Figure 1:
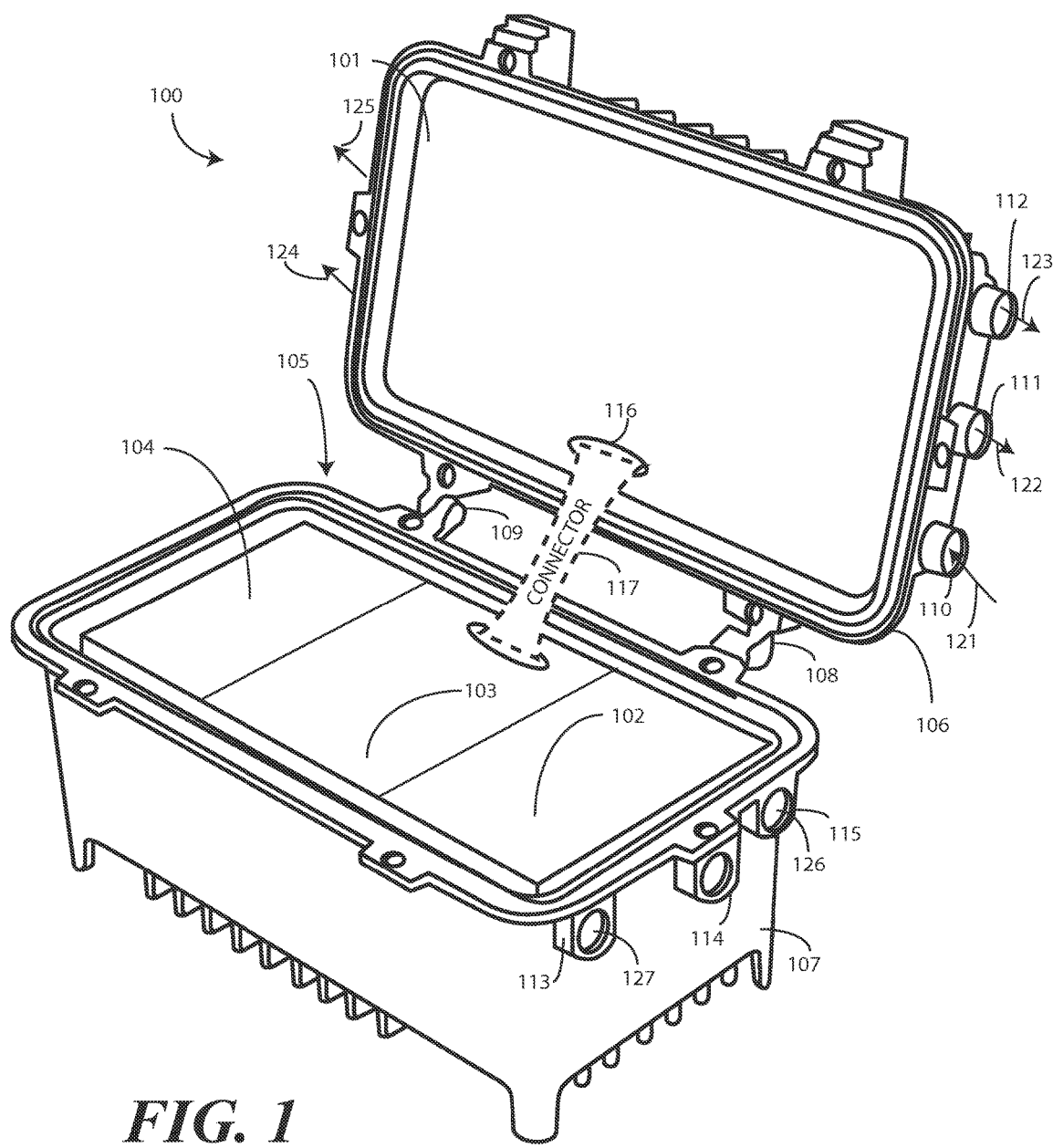
FIG. 1 illustrates an optical node module in accordance with one or more embodiments of the disclosure that is pre-configurable to a radio frequency (RF) amplifier module.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing an optical node module that can be pre-configured to function as an RF amplifier, and that can later be returned to its default configuration operational as an optical node module. Moreover, the optical node module is segmentable to any of a 1×4 optical node module configuration, a 2×2 optical node module configuration, or a 4×4 optical node module configuration, each configuration optionally with or without redundancy. Any process descriptions or blocks in flow charts should be understood as representing modules, segments, or portions of code that includes one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of switching, control, communication, and other operations in an optical node module, whether pre-configured to a RF amplifier or in a default configuration serving as an optical node module, or in other components such as bridger modules and power supplies described herein. The non-processor circuits may include, but are not limited to, optical and/or RF receivers, optical and/or RF transmitters, signal drivers, switching circuits, clock circuits, power source circuits, and user input devices. As such, these functions may be interpreted as steps of a method to perform switching, control, communication, and other operations as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As mentioned above, communications network service providers are offering advanced services such as interactive video, telephony services, high-speed data for Internet and World Wide Web communications. To deliver such services, embodiments of the disclosure contemplate that the corresponding networks must become faster, higher bandwidth, and more reliable.

One way to achieve higher bandwidths for improved communications is through the use of fiber optic cables. Fiber optic cables are capable of carrying orders of magnitude more data than are coax cables. At the same time, fiber optic cable installations are expensive. It would be cost prohibitive, using current pricing models, to fully convert the legacy coax cable networks serving thousands of subscribers to optical networks.

With this cost consideration in mind, many network service providers employ what are known as hybrid fiber coax or "HFC" systems. HFC systems allow service providers to connect end users served by coax cables with head-end or hub devices that deliver data through fiber optic cables in a cost effective manner. In an HFC system, centrally disposed components such as network head ends, hub devices, servers, and so forth deliver and receive data to and from the network using fiber optic cables. Termination points, i.e., customers and their corresponding client devices, are served by coax cables.

The bridge between the centrally disposed components and the client or network termination devices are optical node modules are incorporated into the network. As used herein, a "node" is a device that receives optical signals via a fiber optic network, converts those signals to RF signals, and delivers RF signals via a coax cable network. Accordingly, optical node modules receive optical data via fibers, convert that data to RF signals, and deliver those RF signals to legacy coax networks.

Frequently, amplification is required to successfully deliver those RF signals to the network termination devices with a requisite quality of service. Accordingly, network service providers must place RF amplifiers between nodes and the network termination devices. As used herein, an "amplifier" is a device that receives RF signals, applies signal processing such as pre-amplification, amplification, or other processing, and delivers the processed RF signals to a coax network.

As the demand for data has grown, network services providers have experienced higher and higher data throughput per customer. Embodiments of the disclosure contemplate that this increase in per-user data throughput may be growing at a rapid cumulative annual growth rate. This increased demand and year-over-year growth strains existing networks with respect to the bandwidth or available network capacity per household passed ("HHP"). This is especially true with each HHP is served by a legacy coax network with limited bandwidth capabilities.

As network capacity becomes strained, network communications service providers have adopted two basic approaches to provide each customer with increased data capacity. A first approach involves increasing what is known as "pipe capacity." Using this approach, components of the network are removed and newer components are placed in their stead. Accordingly, network components having, say, a 750 MHz bandwidth capacity are removed from the network. Those components are then replaced with "improved" technology having, for example, an 860 MHz or 1000 MHz bandwidth. If the same number of customers shares this improved service group of components, there becomes incrementally more bandwidth per HHP. The problem with this approach is that replacing network components is costly. What's more, this approach basically requires replacing the entire network to provide each HHP with additional bandwidth, which, as noted above is cost prohibitive in today's dollars.

The second approach is to offer what is known as "service group segmentation" network migration. In this approach, the number of HHP per network component is reduced. Accordingly, rather than one optical node module plus several RF amplifiers serving 64 HHP, the same "node group" only services 32 HHP. This approach requires the installation of additional node groups into the network, which increases cost proportionally to the number of additional node groups that are brought on-line. This approach does have the advantage of allowing the network service provider to push the fiber optic components of the network deeper into the network, which results in the RF coax network components becoming reduced and getting shorter. For network service providers who can afford this option, bandwidth is increased because, for each optical node module plant that activates in the network, one or more amplifiers may be removed since the distances across the coax portions of the network become smaller. Thus, the addition of optical node modules allows RF amplifiers operating in each plant to slowly be replaced by optical node modules as those optical node modules get closer to the customers, i.e., penetrate "deeper" into the network.

The segmentation approach referenced in the preceding paragraph has primarily been addressed in one of two ways. In a first method, network service providers simply replace RF amplifiers with optical node modules. This process can be costly and can result in functional RF amplifiers being mothballed. The second method is accomplished with a "node upgrade kit." A network service provider purchases a node upgrade kit from a vendor and then, essentially, rebuilds an RF amplifier so that it is functional as an optical node module. This latter method can be expensive. Second, it can require technicians with specific skills to be able to rebuild the amplifier to a node without destroying the components. Finally, the rebuilt "node" device can still have bandwidth limitations due to the legacy components that were originally found within the RF amplifier topology.

The only way to overcome these limitations is to have a highly skilled technician essentially remove all the "guts" of the RF amplifier and replace nearly every component with optical node components. Sometimes only the outer housing of the original RF amplifier is all that remains. Placing technicians in the field who are capable of building optical node modules from scratch can be more costly than simply replacing the entire device.

Embodiments of the disclosure contemplate that the future progression of most all networks includes deeper penetration of fiber optic network components and reduced area of legacy coax components. Embodiments of the disclosure also contemplate that network service providers cannot simply replace entire network components due to the exorbitant cost. Accordingly, embodiments of the disclosure provide an optical node module that operates in its default configuration from the manufacturer as an optical node module. However, by one simple "plug and play" operation, one or more optical transmitters and/or receivers can be replaced by a simple RF pre-amplifier that works as a true pre-amplifier in the downstream direction and an amplifier in the upstream direction to pre-configure the optical node module to a RF amplifier. Then, at a later date, the same, simple plug and play operation can be reversed to return the optical node module to its default configuration. Advantageously, this process can be completed with a significant cost savings to the network services provider. What's more, the simple plug and play operation provided by embodiments of the disclosure does not require technicians trained to build optical node modules or RF amplifiers from scratch, thereby increasing the overall cost savings.

It should be noted that the term "upstream" refers to communication toward a central node or hub of a network, while "downstream" communication refers toward communication toward a network termination point, such as an end user. Accordingly, where a content delivery service provider delivers content from an originating server, through an embodiment of the disclosure, to a customer, the content delivery service provider is delivering this content "downstream." Another term for downstream communication is "forward" communication. By contrast, when an end user makes a menu selection with a set-top box or other device, and that selection is transmitted to the content delivery service provider, the selection is transmitted "upstream." Another term for upstream communication is "reverse" communication. These terms will thus be used interchangeably in the discussion below.

Turning now to FIG. 1, illustrated therein is one explanatory module 100 for a HFC network in accordance with one or more embodiments of the disclosure. In one embodiment, the module 100 includes a quad-output amplifier module 101, a power supply 102 operable with the quad-output amplifier module 101, a control board 103, and a node/amplifier determination module 104. For convenience to the end user, in one embodiment the module 100 is a housing module that resembles a vintage luggage trunk, as each of the quad-output amplifier module 101, the power supply 102, the control board 103, and the node/amplifier determination module 104 are placed in a housing 105 having a first portion 106 and a second portion 107.

In this illustrative embodiment, the first portion 106 defines a base of the housing 105, while the second portion 107 defines a lid of the housing 105. Note that the base is disposed above the lid. It should be noted that this is the convention that will be used herein, namely, the bottom, deeper portion is the lid and the upper, shallower portion is the based. The base and lid are pivotably coupled together in this embodiment by one or more hinges 108, 109 so that the housing 105 can be closed for convenient, and weatherproof, deployment in the field. In one embodiment, the base of the housing 105 includes one or more apertures 110, 111, 112 through which input and/or output cables can be coupled. Similarly, the lid of the housing 105 can include one or more apertures 113, 114, 115 through which cables can be coupled to the internal components of the housing 105.

In this illustrative embodiment, the quad-output amplifier module 101 is disposed in the first portion 106 of the housing 105. The power supply 102, control board 103, and node/amplifier determination module 104 are disposed in the second portion 107 of the housing 105. Those of ordinary skill in the art having the benefit of this disclosure will understand that other configurations may be more suitable for other applications. For example, the quad-output amplifier module 101 is disposed in the second portion 107 of the housing 105, while the power supply 102, control board 103, and node/amplifier determination module 104 are disposed in the first portion 106 of the housing 105 and so forth.

In one embodiment, the quad-output amplifier module 101 comprises a configured port 116. As will be described in more detail below, in one embodiment the configured port 116 is to couple to one of a RF pre-amplifier or one or more optical transmitter modules or receiver modules. Either the RF pre-amplifier or the one or more optical transmitter modules or receiver modules can be placed in the right side of the lid to serve as the node/amplifier determination module 104. In one embodiment, when the configured port 116 is coupled to the one or more optical transmitter modules or receiver modules in a default configuration, the module 100 is operable as an optical node module. When the configured port 116 is coupled to the RF pre-amplifier, the module 100 is transformed to be operable as an RF amplifier.

Accordingly, when the one or more optical transmitter modules or receiver modules are disposed in the lid as the node/amplifier determination module 104, the module 100 is in its default configuration operable as an optical node module. By contrast, a user can pre-configure the module 100 to a RF amplifier by replacing the one or more optical transmitter modules or receiver modules with an RF pre-amplifier. When the RF pre-amplifier is disposed in the lid as the node/amplifier determination module 104, the module 100 is pre-configured to a RF amplifier. This will be explained in more detail below with reference to subsequent figures.

In one embodiment, one or more connectors 117 couple the configured port 116 to the control board 103, which is electronically coupled to the node/amplifier determination module 104. Other connectors may provide power to the node/amplifier determination module 104. The control board 103 may include one or more connectors to which a corresponding connector may be attached. In one embodiment, each connector may be coupled to an external power source. Power source connectors may be disposed along the housing 105 so that cables from external power sources may be attached in one or more embodiments.

The module 100 of FIG. 1 is envisioned to be deployed in its default configuration as an optical node module. This default configuration can be configured in the factory in one embodiment, or alternatively by an end user in other embodiments. Accordingly, in the default configuration the node/amplifier determination module 104 would comprise one or more optical transmitter modules or receiver modules. In the field, the end user can replace the one or more optical transmitter modules or receiver modules by installing a RF pre-amplifier that functions as a pre-amplifier in the downstream and as an amplifier in the upstream to "temporarily," i.e., in the short term, convert the module 100 to an RF amplifier. This temporary configuration can be used in the interim where new RF amplifier modules are required. However, when the time comes to return this pre-configured "RF amplifier" to its default configuration as an optical node module, the only change required is to replace the RF pre-amplifier serving as the node/amplifier determination module 104 with a downstream optical receiver and upstream optical transmitter to fully convert the module 100 to a 1×4 optical node module. (Two upstream optical transmitters and downstream optical receivers can be used as the node/amplifier determination module 104 to create a 2×2 optical node module or a 1×4 optical node module with redundancy.) In one or more embodiments, the quad-output amplifier module 101 provides the necessary "hooks" to connect to either the optical components or RF pre-amplifier that allow the transformation from default configuration as an optical node module to a pre-configured RF amplifier.

The result is a node-ready product that can be easily transformed to a RF amplifier in the field, but then can quickly be returned to its default configuration as an optical node module. This transformation can occur in the factory in one embodiment, or alternatively in the field in other embodiments. Embodiments of the disclosure thus focus on deploying a module 100 that is easily convertible to an RF amplifier, but with internal components that are much more "node-like", and that will much more effectively return to optical node modules when that conversion event is required due to fiber pushing further into the network. Benefits to the end user include minimal downtime and minimal future expense to convert the "pre-configured" RF amplifier location into an optical node location. Accordingly, segmenting a service group area into a smaller one becomes faster, cheaper, and easier. As will be described in later figures, embodiments of the disclosure allow for network progression that converts a "node plus one RF amplifier" network architecture into a "node plus zero RF amplifier" network architecture where each amplifier easily converts itself to a node.

In one embodiment, the quad-output amplifier module 101 comprises five bidirectional ports 121, 122, 123, 124, 125 for communication with other devices. While five bidirectional ports 121, 122, 123, 124, 125 for communication with other devices will be used for discussion purposes for ease of illustration, those of ordinary skill in the art having the benefit of this disclosure will understand that different numbers of bidirectional ports could be used as well. It should be noted that four of the ports are active bidirectional ports 122, 123, 124, 125. However, they could be be any type of output ports. For example, they can be bridger outputs, trunk outputs, or other forms of outputs. The difference between trunk and bridger outputs relates to gain and output level performance. Trunk outputs are lower gain, higher performance outputs meant to deliver signals longer distances without intervening signal taps. Bridger outputs operate at higher levels with more gain and are meant to be tapped off to be delivered to homes.

When the node/amplifier determination module 104 is an RF pre-amplifier, bidirectional port 121 is used to send and receive RF signals to upstream components of a HFC network via a coax cable network. Similarly, bidirectional ports 122, 123, 124, 125 can be connected communication to downstream devices and used to send and receive RF signals to downstream components of the HFC network via a coax cable network.

In one embodiment, when the module 100 is in the default configuration as an optical node module, the bidirectional port 121 of the quad-output amplifier module 101 is no longer used for data communication. (It can remain connected to an external cable, for example, to deliver power to the quad-output amplifier module 101.) When the node/amplifier determination module 104 is one or more optical transmitter modules or receiver modules, in one embodiment, each optical transmitter module or receiver module comprising an optical port 126, 127. Accordingly, these optical ports 126, 127 can be used for upstream communication of optical signals via a fiber optic cable network of the HFC network.

Figure 2:
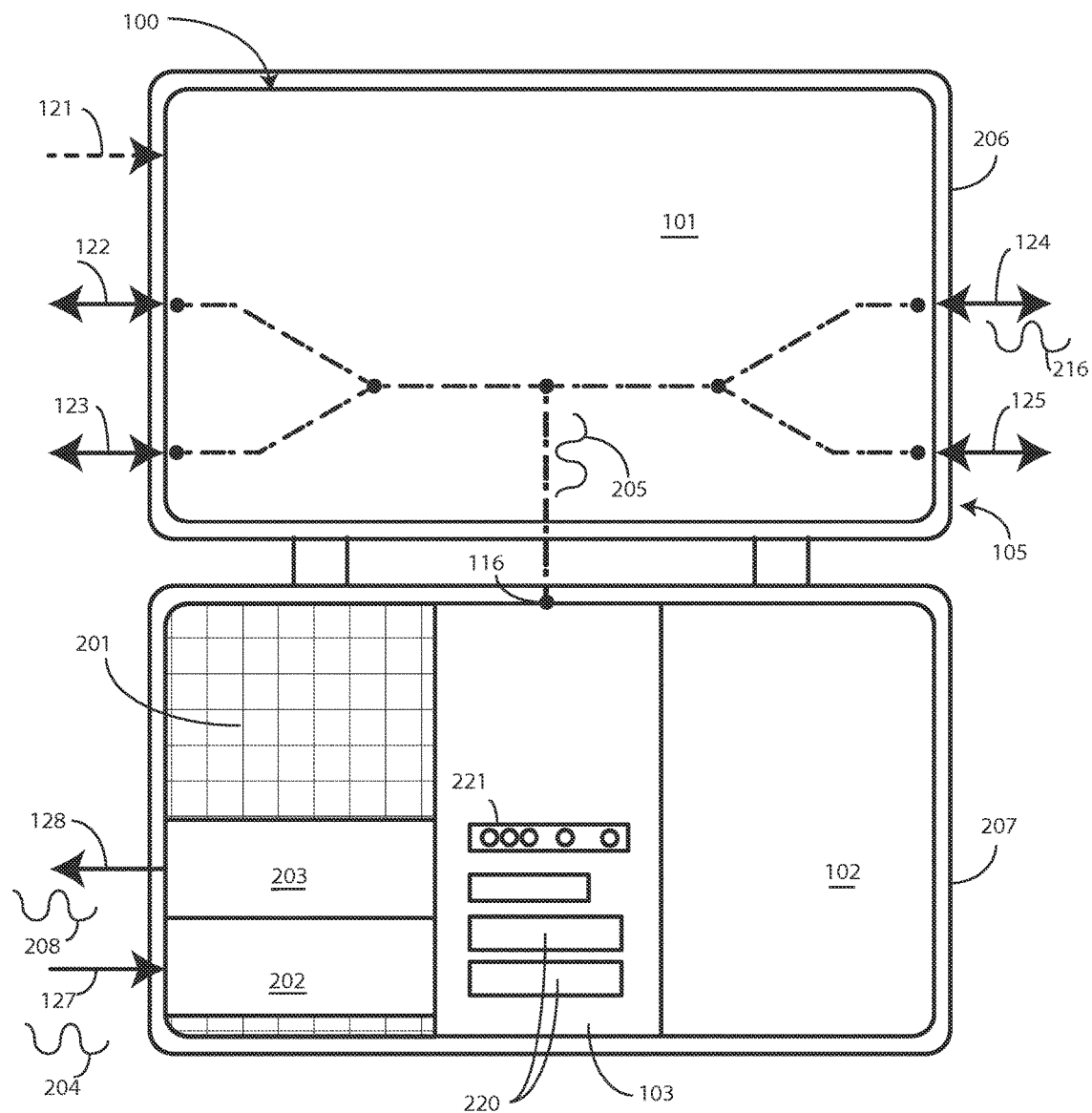
FIG. 2 illustrates an optical node module in accordance with one or more embodiments of the disclosure in a 1×4 default configuration.

Turning now to FIG. 2, illustrated therein is a system diagram of the module 100 of FIG. 1. In this illustrative embodiment, the module 100 is shown as a housing module with a lid 207 of the housing 105 coupled to a base 206 of the housing 105. In this illustrative embodiment, the base 206 of the housing 105 includes the quad-output amplifier module 101, while the lid 207 of the housing 105 includes the power supply 102 and control board 103.

In this embodiment, the lid 207 of the housing 105 defines a module slot(s) 201 to receive one of a RF pre-amplifier or one or more optical transmitter modules or receiver modules as the node/amplifier determination module (104). The module 100 of FIG. 2 is in its default configuration operating as an optical node module. Accordingly, a first optical receiver module 202 and a first optical transmitter module 203 are disposed in the module slot(s) 201. The first optical receiver module 202 and first optical transmitter module 203 are coupled to the control board 103 so as to be in communication with the quad-output amplifier module 101 through the configured port 116.

In this illustrative embodiment, each of the first optical receiver module 202 and first optical transmitter module 203 comprises a corresponding optical port 127, 128. Accordingly, the bidirectional port 121 of the quad-output amplifier module 101 is not used for upstream, or reverse, communication in this default configuration. The first optical receiver module 202 receives optical communication signals 204 from a fiber optic cable portion of an HFC network. The first optical receiver module 202 then converts those optical communication signals 204 to RF communication signals 205, which are delivered to the configured port 116. In this embodiment, the module 100 is configured as a 1×4 optical node module. Accordingly the RF communication signals 205 are delivered to each of the four bidirectional ports 122, 123, 124, 125 of the quad-output amplifier module 101.

In the reverse direction, RF communication signals 216 are received by one or more of the four bidirectional ports 122, 123, 124, 125 of the quad-output amplifier module 101. The quad-output amplifier module 101 then delivers these RF communication signals 216 to first optical transmitter module 203. The first optical transmitter module 203 converts these RF communication signals 216 to optical communication signals 208. The first optical transmitter module then delivers the optical communication signals 208 upstream through its optical port 128.

Note that in FIG. 2, the module slot(s) 201 is not fully occupied. Embodiments of the disclosure contemplate that some applications will call for a 1×4 optical node configuration, which employs a first optical receiver module 202 and first optical transmitter module 203 delivering a common downstream communication signal to all four bidirectional ports 122, 123, 124, 125 of the quad-output amplifier module 101. However, due to desired segmentation of networks, other applications will call for a 2×2 optical node configuration, a 4×4 optical node configuration, or other optical node configuration. Accordingly, in one or more embodiments the receiving cavity is sufficiently large as to hold multiple optical network transmitter modules or receiver modules.

Figure 3:
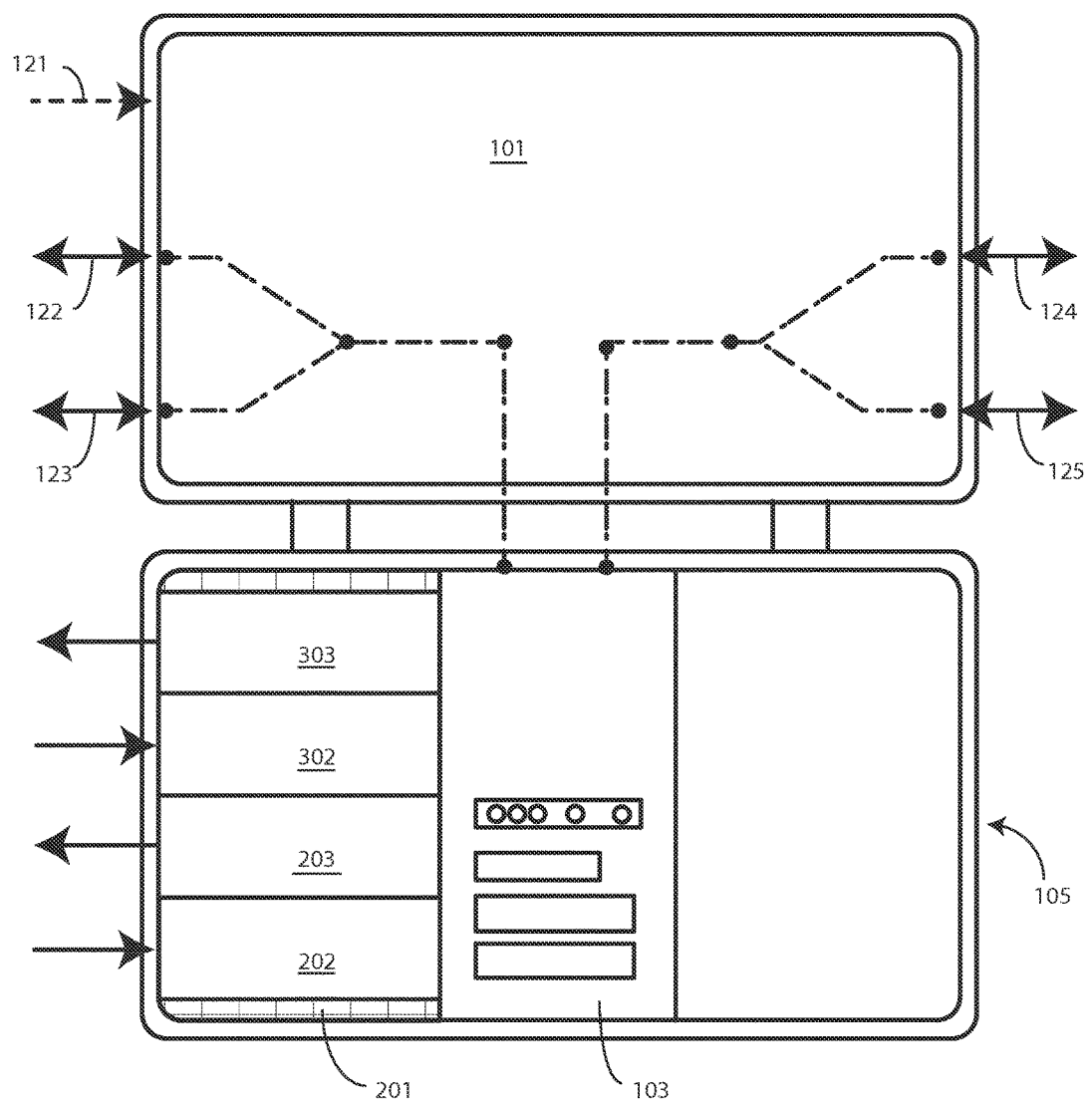
FIG. 3 illustrates an optical node module in accordance with one or more embodiments of the disclosure in a 2×2 default configuration.

Turning now to FIG. 3, illustrated therein is one such variation. In FIG. 3, the module 100 is configured in a 2×2 optical node configuration. In FIG. 2, two optical receiver modules 202, 302 and two optical transmitter modules are disposed in the module slot(s) 201. In this illustrative embodiment, a first optical receiver module 202 receives downstream optical communication signals, converts those optical communication signals to downstream RF signals, and delivers the downstream RF communication signals to two active downstream ports 124, 125 of the four bidirectional ports 122, 123, 124, 125 of the quad-output amplifier module 101. Similarly, a second optical receiver module 302 receives downstream optical communication signals, converts those optical communication signals to downstream RF signals, and delivers the downstream RF communication signals to two active bidirectional ports 122, 123 of the four bidirectional ports 122, 123, 124, 125 of the quad-output amplifier module 101.

In the reverse direction, two active downstream ports 124, 125 of the four bidirectional ports 122, 123, 124, 125 of the quad-output amplifier module 101 receive upstream RF communication signals and deliver those RF communication signals to one of the optical transmitter modules 203. Two other active bidirectional ports 122, 123 of the four bidirectional ports 122, 123, 124, 125 of the quad-output amplifier module 101 receive upstream RF communication signals and deliver those RF communication signals to another optical transmitter module 303 for upstream communication. Accordingly, the same module 101 that was in a 1×4 optical module configuration in FIG. 1 is now in a 2×2 configuration in FIG. 2. In a bigger housing 105, four optical transmitter modules and four optical receiver modules could be included, each communicating with one downstream port of the four bidirectional ports 122, 123, 124, 125 of the quad-output amplifier module 101 to provide a 4×4 optical node module configuration.

Selecting between the 1×4, 2×2, and 4×4 optical node module configurations is not the only choice offered to end users by the module 100 of FIG. 2. In still other configurations, redundancy can be achieved to provide a more reliable optical node module. Illustrating by example, in another embodiment the first optical receiver module 202 receives downstream optical communication signals, converts those optical communication signals to downstream RF signals, and delivers the downstream RF communication signals to the four bidirectional ports 122, 123, 124, 125 of the quad-output amplifier module 101. During this time, the second optical receiver module 302 is not in communication with the four bidirectional ports 122, 123, 124, 125 of the quad-output amplifier module 101. If for some reason the first optical receiver module 202 should fail, a switching circuit of the control board 103 can switch in the second optical receiver module 302 to communicate with the four bidirectional ports 122, 123, 124, 125 of the quad-output amplifier module 101. Thus, downstream redundancy is achieved.

In the reverse direction, the four bidirectional ports 122, 123, 124, 125 of the quad-output amplifier module 101 receive upstream RF communication signals and deliver those RF communication signals to one or both of the optical transmitter modules 203. In one embodiment, both optical transmitter modules 203 are constantly ON. Selective switching can of which upstream signal to receive can be performed by upstream devices. Accordingly, a 1×4 optical node module with redundancy is achieved. In this same fashion, with a sufficiently large housing 105 and module slot(s) 201, a 2×2 optical node module configuration with redundancy or a 4×4 optical node module with redundancy can be achieved using embodiments of the disclosure. Still other embodiments will be obvious to those of ordinary skill in the art having the benefit of this disclosure.

Figure 4:
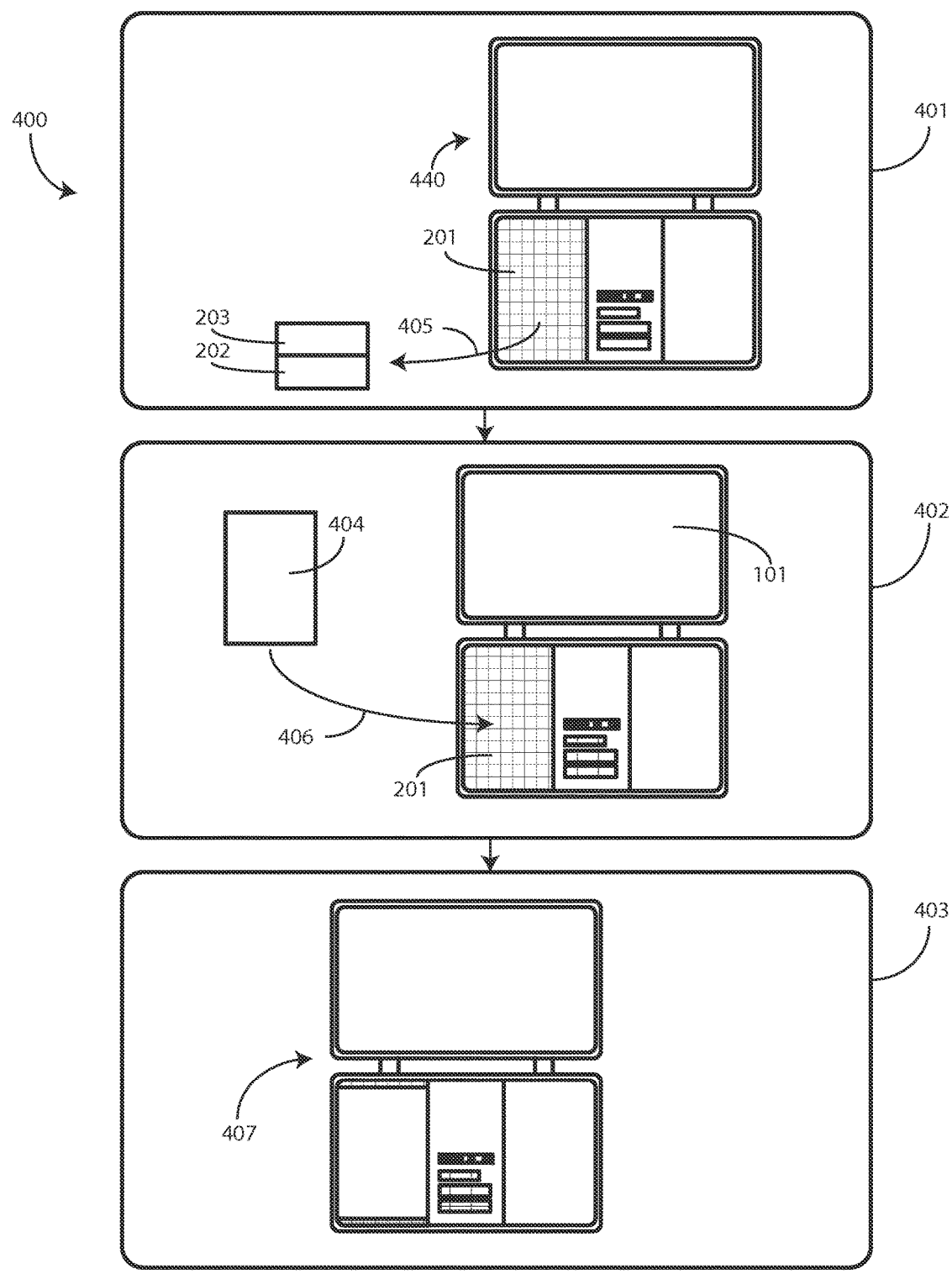
FIG. 4 illustrates a method of pre-configuring an optical node module in accordance with one or more embodiments of the disclosure to an RF amplifier module.

Turning now to FIG. 4, illustrated therein is a method 400 suitable for use in a HFC system in accordance with one or more embodiments of the disclosure. At step 401, an optical node module 440 is provided. An end user, manufacturer, or other entity has elected to temporarily, in the short term, use the optical node module as a RF amplifier. Accordingly, the entity initiates a pre-configuration process at step 401 to pre-configure the optical node module 440 to a RF amplifier by replacing one or more optical transmitter modules 203 or optical receiver modules 202 with an RF pre-amplifier 404. At step 401 the entity has removed 405 the one or more optical transmitter modules 203 or optical receiver modules 202 from a module slot(s) 201 of the optical node module 440.

At step 402, the entity replaces 406 the optical components removed at step 401 with an RF pre-amplifier 404 by inserting the RF pre-amplifier 404 into the module slot(s) 201. In one embodiment, the RF pre-amplifier 404 comprises a combination downstream RF pre-amplifier and upstream RF amplifier. Thus, in one embodiment the RF pre-amplifier is to function as a pre-amplifier in the downstream direction and an amplifier in the upstream direction. For simplicity, rather than calling the RF pre-amplifier 404 an "RF downstream pre-amplifier and upstream amplifier module," this element is simply referred to herein as RF pre-amplifier 404.

In one or more embodiments, the optical node module 440 of FIG. 4 includes the quad-output amplifier module 101 described above with reference to FIGS. 1-3. Accordingly, the quad-output amplifier module 101 includes one bidirectional port (121) to communicate with a network hub and four bidirectional ports (122, 123, 124, 125) to communicate with devices farther from the hub. In one embodiment, the replacing 406 of the one or more optical transceiver or receiver modules with the RF pre-amplifier 404 includes coupling the RF pre-amplifier between the one bidirectional port (121) and the four bidirectional ports (122, 123, 124, 125) to define an RF signal path between the one bidirectional port (121) and the four bidirectional ports (122, 123, 124, 125). The resulting "pre-configured" RF amplifier module 407 is shown at step 403.

It should be noted that, in one or more embodiments, a manufacturer or other entity may elect to initially sell the pre-configured RF amplifier module 407 to an end user. However, the pre-configured RF amplifier module 407 differs from prior art RF amplifiers because embodiments of the disclosure have contemplated step 401 and step 402 by including all the components, interconnections, and other elements required to complete step 401 and step 402. With the contemplation that, at some time, networks will evolve to use nodes rather than amplifiers, this contemplation allows the steps of FIG. 6 described below to be accomplished in less time, at less cost, and with reduced network downtime.

Figure 5:
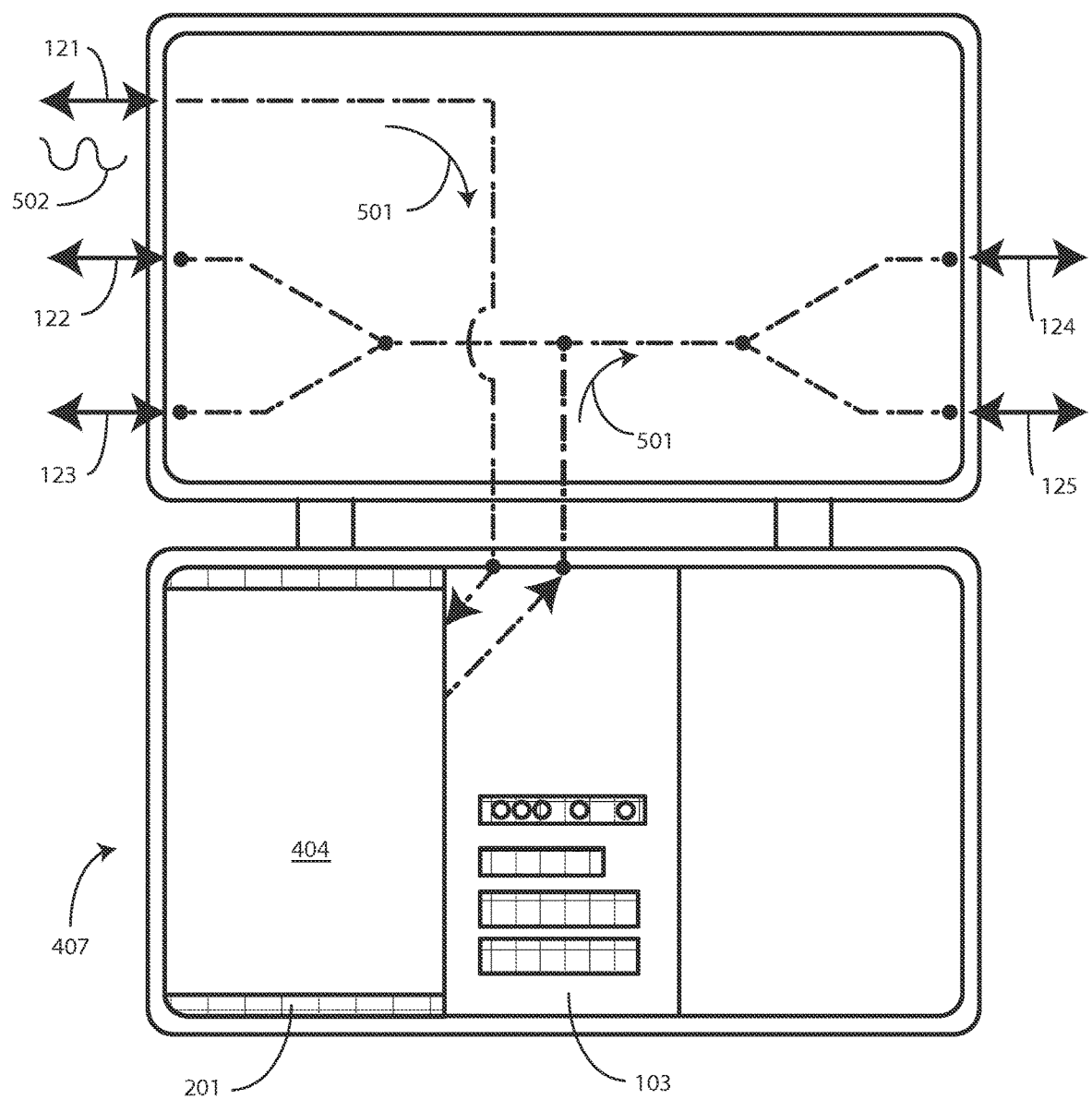
FIG. 5 illustrates an optical node module in accordance with one or more embodiments of the disclosure configured to an RF amplifier module.

Turning now to FIG. 5 illustrated therein is the pre-configured RF amplifier module 407 in more detail. As notes above, in one embodiment when the RF pre-amplifier 404 is inserted within the module slot(s) 201, the RF pre-amplifier 404 is coupled between the one bidirectional port 121 and the four active bidirectional ports 122, 123, 124, 125 to define an RF signal path 501 between the one bidirectional port 121 and the four active bidirectional ports 122, 123, 124, 125. In this embodiment, the bidirectional port 121 comprises an RF reverse communication port and the four active bidirectional ports 122, 123, 124, 125 each comprising an active RF forward communication port.

In one embodiment, the RF pre-amplifier 404 and the quad-output amplifier module 101 are electrically coupled with the control board 103 such that the RF signal path 501 passes through the control board 103. In another embodiment, the configured port (116) of the quad-output amplifier module 101 connects to the RF pre-amplifier 404 directly. Still other configurations will be obvious to those of ordinary skill in the art having the benefit of this disclosure.

Accordingly, the one bidirectional port 121 can receive downstream RF signals 502 from an upstream component and can deliver them to the RF pre-amplifier 404 through the RF signal path 501. The RF pre-amplifier 404 can process the downstream RF signals 502 and deliver them to the four active bidirectional ports 122, 123, 124, 125 for delivery to downstream components via a coax cable network. In one embodiment, when the configured port (116) of the quad-output amplifier module 101 is coupled to the RF pre-amplifier 404, and an RF signal path 501 is defined between the bidirectional port 121 and the four active bidirectional ports 122, 123, 124, 125 of the quad-output amplifier module 101, a 1×4 RF amplifier configuration is defined as shown in FIG. 5.

Figure 6:
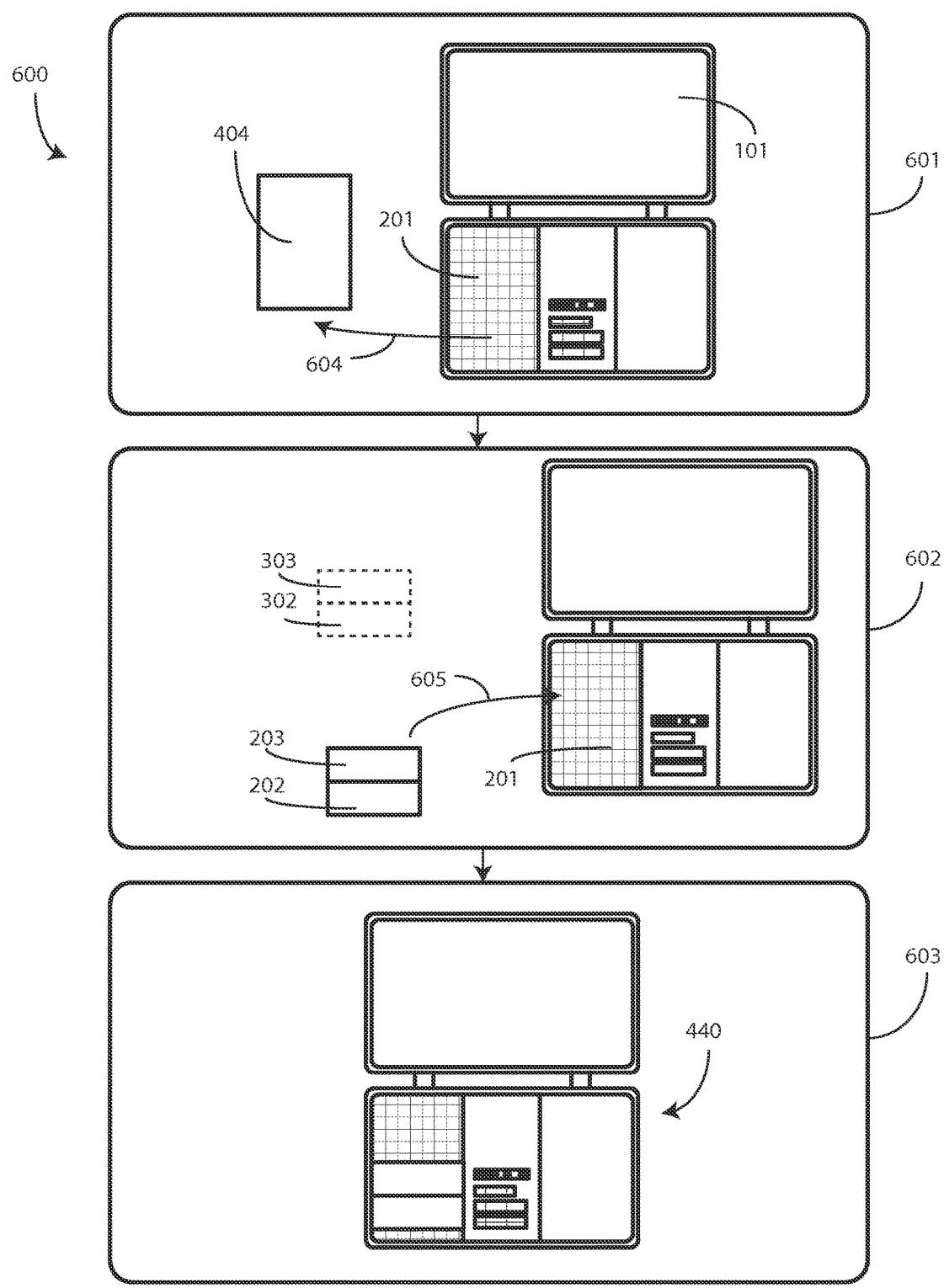
FIG. 6 illustrates a method of returning an optical node module from an RF amplifier to a default configuration of an optical node module in accordance with one or more embodiments of the disclosure.

Turning now to FIG. 6, illustrated therein is a method 600 of reconfiguring the optical node module (440) of FIG. 4 from its pre-configured RF amplifier module 407 status to the default configuration operating as an optical node module 440. In one embodiment, the reconfiguring of FIG. 6 occurs after the pre-configuring of FIG. 4.

At step 601, the method 600 removes 604 the RF pre-amplifier 404 from the module slot(s) 201. In one embodiment, this opens the RF signal path (501) defined in the embodiment of FIG. 5 by removing 604 the component, i.e., RF pre-amplifier 404, coupling the bidirectional port (121) of the quad-output amplifier module 101 and the four active bidirectional ports (122, 123, 124, 125) of the quad-output amplifier module 101.

At step 602, the method 600 recouples 605 the one or more optical transmitter modules 203 or optical receiver modules 202 to the four active bidirectional ports (122, 123, 124, 125) by connecting the one or more optical transmitter modules 203 or optical receiver modules 202 in the module slot(s) 201.

In one embodiment, step 602 recouples 605 one optical transmitter module 203 and one optical receiver module 202 to the four active bidirectional ports (122, 123, 124, 125) to define a 1×4 optical node module 440, which is shown at step 603. However, in another embodiment, step 602 recouples 605 two optical transmitter modules and two optical receiver modules to define either a 1×4 optical node module with redundancy or a 2×2 optical node module. For example, the recoupling 605 can comprise coupling a first optical transmitter module 203 and a first optical receiver module 202 to a first two active bidirectional ports (122, 123) of the four active bidirectional ports (122, 123, 124, 125) and coupling a second optical transmitter module 303 and a second optical receiver module 302 to a second two active ports (124, 125) of the four active bidirectional ports (122, 123, 124, 125), thereby defining a 2×2 optical node module. In yet another embodiment, step 602 recouples 605 four optical transmitter modules and four optical receiver modules to define either a 2×2 optical node module with redundancy or a 4×4 optical node module. Other configurations will be obvious to those of ordinary skill in the art having the benefit of this disclosure.

Turning now to FIGS. 7-10, illustrated therein are schematic block diagrams showing components of one explanatory module 100, both in the default configuration as an optical node module and in a user configurable pre-configuration to a RF amplifier module. The module 100 of FIGS. 7-10 advantageously provides, in the pre-configured RF amplifier module shown in FIGS. 9 and 10, a true four-output RF amplifier. Prior art RF amplifiers frequently employ only three outputs. Further, the module 100 of FIG. 7010 advantageously starts in a default configuration as an optical node that is expecting optical inputs, but that can be converted to an RF amplifier module to receive RF inputs. As noted above, this "node to amplifier" transition advantageously avoids problems with legacy amplifiers that restrict the ability to transition from amplifier to node.

The module 100 supports the contemplation of embodiments of the disclosure that, as HFC networks progress, more and more of the amplifier elements in such networks are ultimately going to have to convert to nodes to provide deeper and deeper penetration of fiber into the network in the downstream direction. Rather than clumsily attempting to retrofit an amplifier with optical components, embodiments of the disclosure provide the proposition that one should start with a node, but then reconfigure it temporarily to an amplifier. While it may be a little more costly in the front end, this option is more flexible and offers higher bandwidth in the downstream direction than prior art methods.

The analogy is initially building simplex apartments with the knowledge that they will one day be converted to quad apartments. Prior art amplifier solutions employ a dedicated RF amplifier with only three outputs; it can never have four. Also, the entire electronic configuration must be rebuilt to make the conversion as noted above. By contrast, with embodiments of the present disclosure the conversion from node to amplifier is simple and efficient. Also the limitations of legacy amplifiers are avoided when bridger modules in accordance with embodiments of the disclosure are used.

Figure 7:
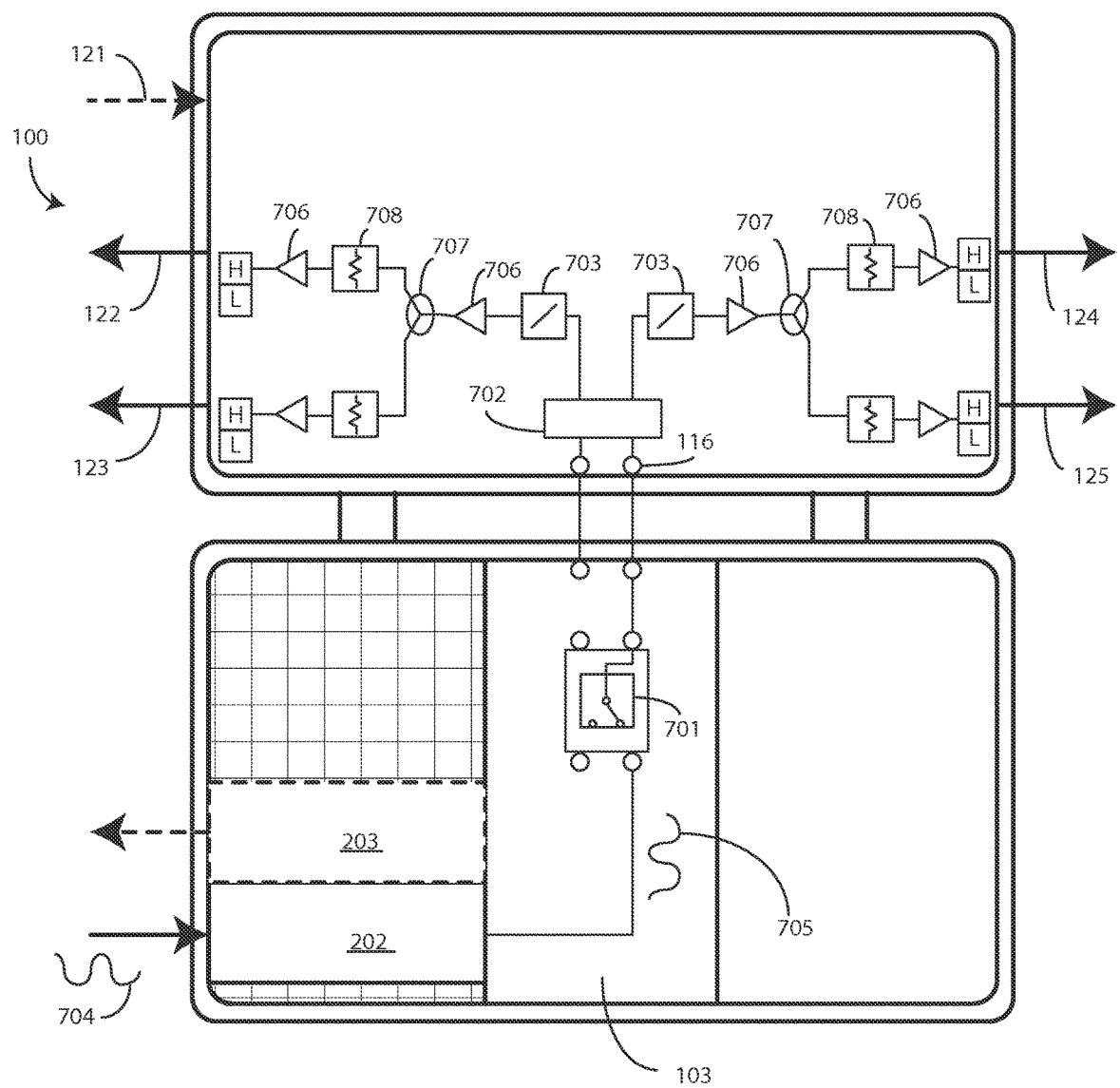
FIG. 7 illustrates downstream communication using one explanatory optical node module in accordance with one or more embodiments of the disclosure.

Beginning with FIG. 7, the module 100 is configured as an optical node module and is communicating in the downstream direction. Thus, the module 100 is in the default configuration and any RF signal path between the bidirectional port 121 of the quad-output amplifier module 101 and the other four active bidirectional ports 122, 123, 124, 125 is open.

While the module 100 could have two service groups, which means two optical receivers and two optical transmitters, the embodiment of FIG. 7 includes just one service group. This means that only one optical receiver module 202 and one optical transmitter module 203 are used. Accordingly, all four active bidirectional ports 122, 123, 124, 125 of the quad-output amplifier module 101 are fed with one downstream signal from the optical receiver module 202. The bidirectional port 121 is not used for data communication. The cable that would be connected to it for RF data communication could be removed, or alternatively could deliver power to the quad-output amplifier module 101.

Each of the four active bidirectional ports 122, 123, 124, 125 is shown here with an "H" and an "L." These letters refer to different frequency splits. The H is a higher frequency and is used for downstream communication. The L is the low band and is the upstream link combing back to the module 100. Illustrating by example, the low band frequencies may be on the order of 5-42 MHz, while the high band frequencies may be on the order of 54-1002 MHz. These values are explanatory only and are provided to assist the reader in understanding the schematic diagram of FIG. 7.

In one embodiment, optical receiver module 202 receives optical communication signals 704 from a fiber optic cable portion of an HFC network. The first optical receiver module 202 then converts those optical communication signals 704 to RF communication signals 705, which are delivered through a switch 701 to the configured port 116.

The switch 701 can be used for optical redundancy. In this embodiment, the module 100 is configured as a 1×4 optical node module. Accordingly the RF communication signals 705 are delivered through the switch 701 to each of the four bidirectional ports 122, 123, 124, 125 of the quad-output amplifier module 101. If there were a second optical receiver module, and the first optical receiver module 202 failed, switch 701 could be used to couple the second optical receiver module to the four bidirectional ports 122, 123, 124, 125.

The RF communication signals 705 are then delivered to a switching network 702. In one embodiment, the switching network 702 is used in a segmented application to determine where signals must go. For example, if two optical transmitter modules and two optical receiver modules are used in a 2×2 segmented operation, the switching network 702 can deliver signals from a first optical receiver module to a first two active bidirectional ports (122, 123) while delivering signals from a second optical receiver module to a second two active bidirectional ports (124, 125), and so forth. Thus, in one embodiment the switching network 702 comprises one or more segmentation switches to transition the quad-output amplifier module 101 between at least a 1×4 optical node module configuration and a 2×2 optical node module configuration when the module is in the default configuration. From the switching network 702, the RF communication signals 705 pass through tilt adjusters 703, amplifiers 706, signal splitters 707, attenuation modules 708, and optionally more amplifiers 706 en route to the four active bidirectional ports 122, 123, 124, 125.

Other components could be included in the configuration of FIG. 7 as well. For example, in one embodiment the control board 103 can include reconfiguration circuits that assist in segmentation as well. For example, if a single service group is used in the module 100, but a user wants to later convert it to two service groups, the user would add a second optical receiver module and second optical transmitter module. To provide true plug and play functionality, the user may toggle a switch at the control board 103 to reconfigure the module 100. In one or more embodiments, all cabling and connectors are in place to quickly and easily transition between a 1×4 configuration and a 2×2 configuration.

Similarly, in one or more embodiments the control board 103 or another device can receive daughter cards (shown as elements (220) in FIG. 2) that are operable with a data over cable service interface specification (DOCSIS) transponder (shown as element (221) in FIG. 2). The DOCSIS transponder, working with the daughter cards, can poll the various components in the module to determine "health" parameters such as optical input levels, optical output levels, and so forth for monitoring purposes. In one embodiment, the DOCSIS transponder passes this information to a system provider's head end.

Figure 8:
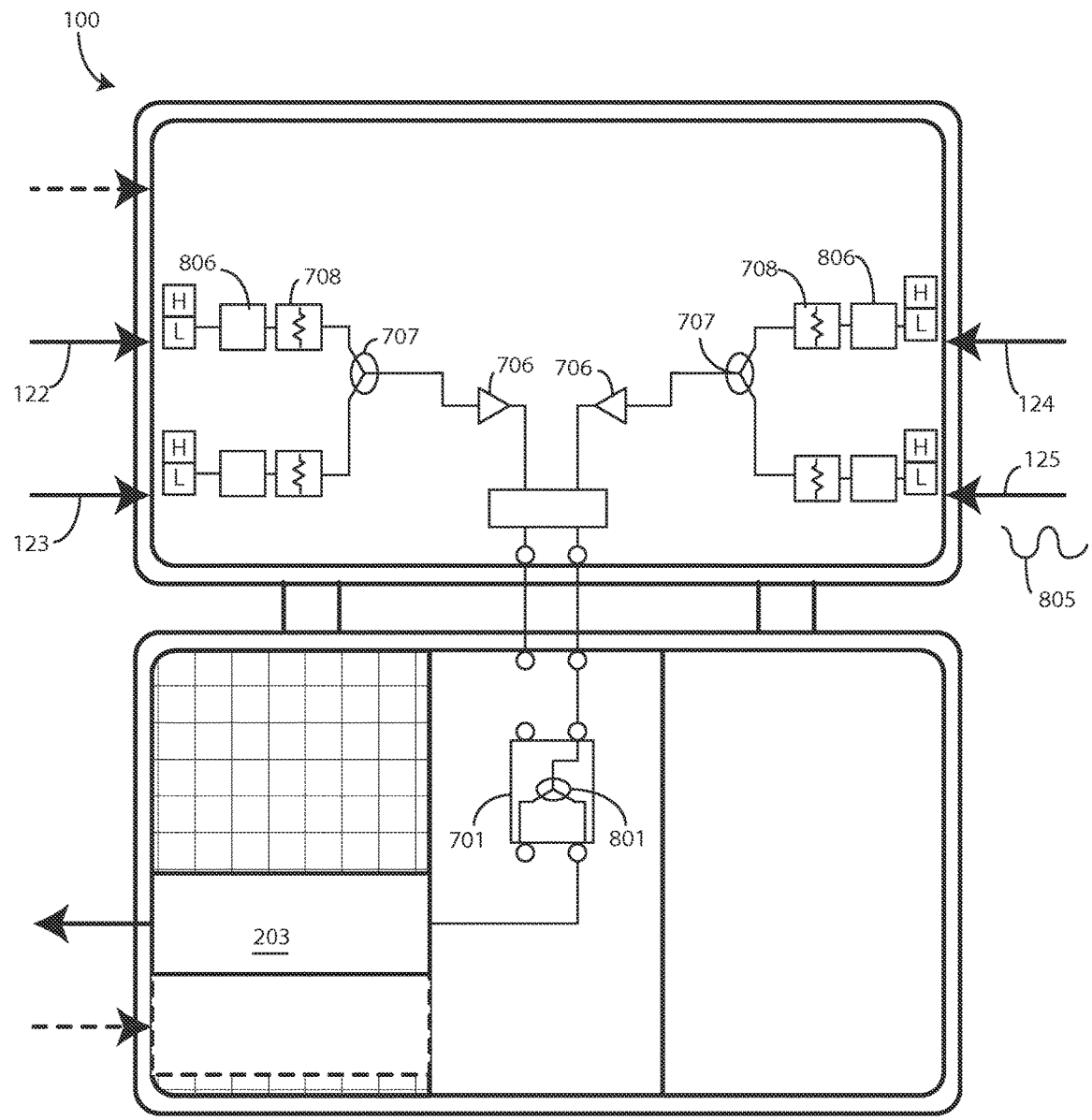
FIG. 8 illustrates upstream communication using one explanatory optical node module in accordance with one or more embodiments of the disclosure.

Turning now to FIG. 8, the module 100 is shown in the default configuration, but communicating in the upstream direction. RF communication signals 805 are received at one or more of the four active bidirectional ports 122, 123, 124, 125. They then pass to a troubleshooting switch 806. The troubleshooting switch 806 allows an operator of the module 100 to remotely switch in different levels of attenuation or adjustment for diagnostic purposes. For example, in one embodiment an operator can use the troubleshooting switch 806 to apply no attenuation, apply 6 dB of attenuation, or shut off the branch entirely. Other configurations of troubleshooting switches will be obvious to those of ordinary skill in the art having the benefit of this disclosure.

From the troubleshooting switch 806, which is optional in one or more embodiments, the RF communication signals pas through attenuation modules 708, signal splitters 707, and amplifiers 706 en route to the switching network 702. They are then passed through the configured port 116 to switch 701, which is configured as a signal combiner, to the optical transmitter module 203.

Figure 9:
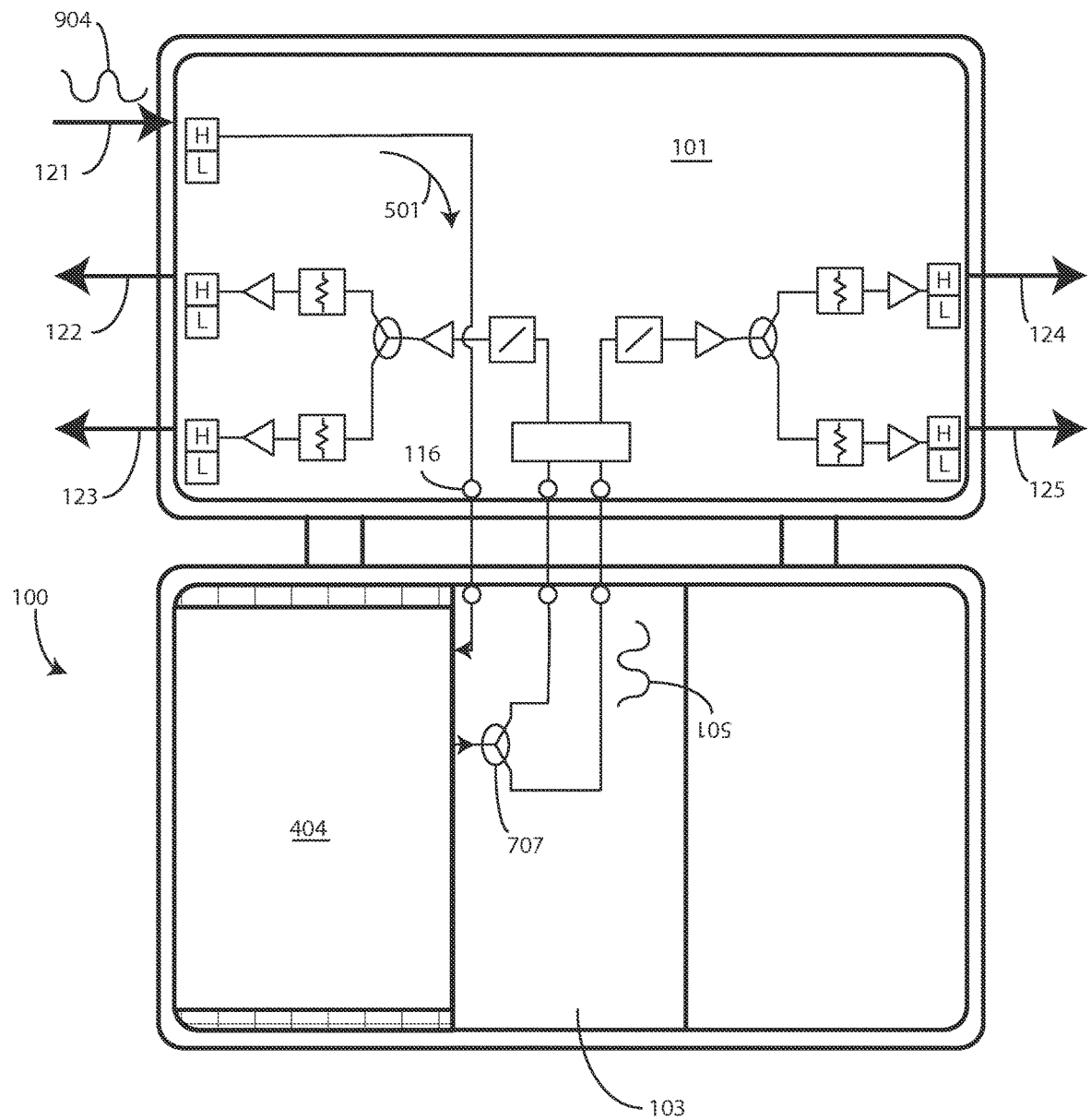
FIG. 9 illustrates downstream communication using one explanatory optical node module pre-configured to a RF amplifier in accordance with one or more embodiments of the disclosure.
Figure 10:
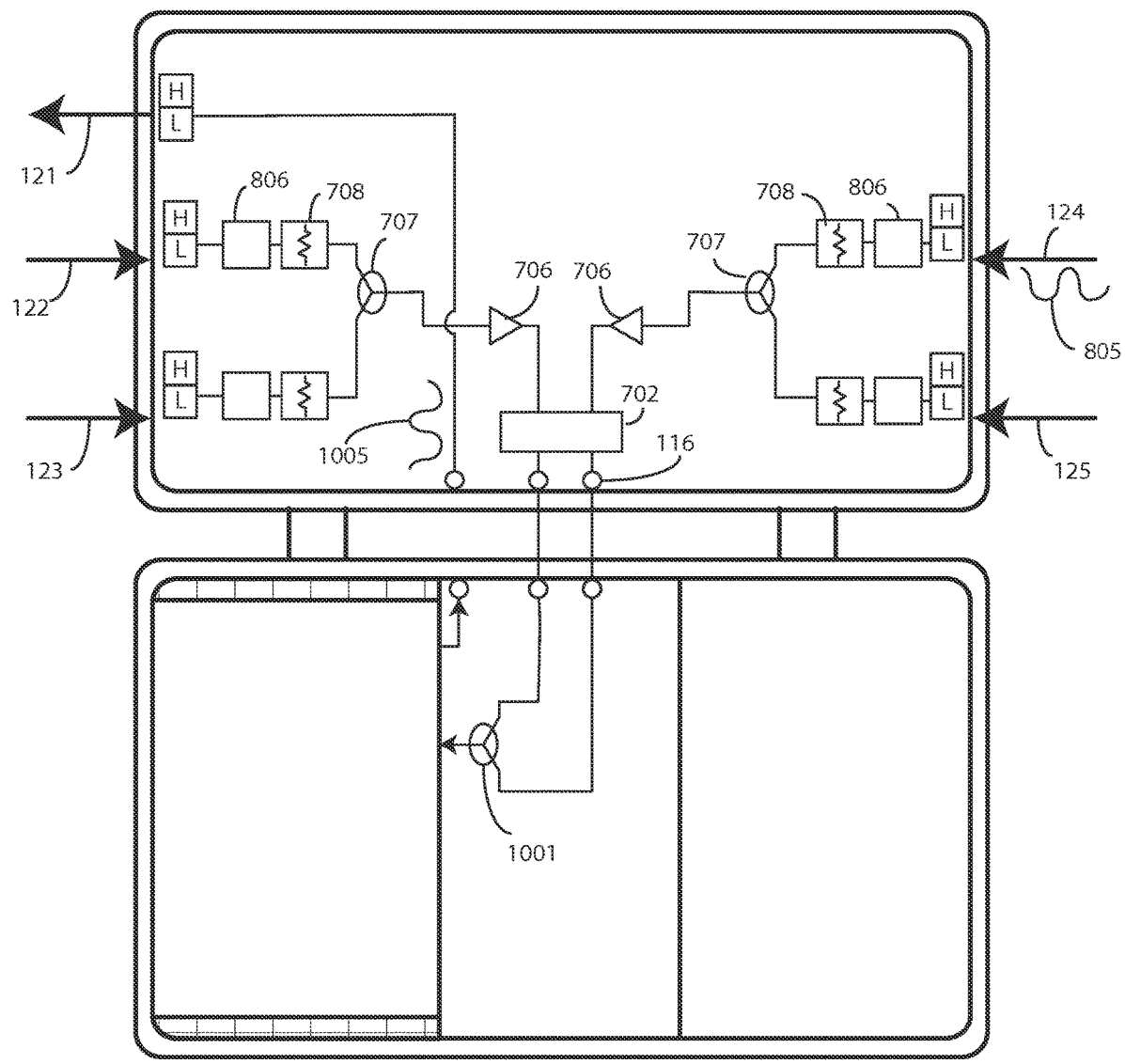
FIG. 10 illustrates upstream communication using one explanatory optical node module pre-configured to a RF amplifier in accordance with one or more embodiments of the disclosure.

Turning now to FIG. 9, the module 100 has been pre-configured to a RF amplifier by replacing the optical components of FIGS. 7-8 with a RF pre-amplifier 404. The module 100 is communicating in the downstream direction. Since the module 100 includes the quad-output amplifier module 101, the resulting RF amplifier includes five bidirectional active ports 121, 122, 123, 124, 125. In this embodiment, the RF pre-amplifier 404 is coupled between one active bidirectional port 121 and the four other active bidirectional ports 122, 123, 124, 125 to define an RF signal path 501 between the one active bidirectional port 121 and the four other active bidirectional ports 122, 123, 124, 125.

Downstream RF signals 904 are received at bidirectional port 121 for communication with upstream devices. They are delivered to the configured port 116. They then pass to the RF pre-amplifier 404. In one embodiment, they optionally pass through the control board 103. Since this is the downstream direction, in one embodiment the RF pre-amplifier applies pre-amplification to the downstream RF signals 904 and delivers them to a signal splitter 707. They then pass to the four active bidirectional ports 122, 123, 124, 125 as described above with reference to FIG. 7.

Turning to FIG. 10, the module 100 is again pre-configured to a RF amplifier. However, the module 100 is communicating in the upstream direction. RF communication signals 805 are received at one or more of the four active bidirectional ports 122, 123, 124, 125. They then pass to a troubleshooting switch 806. From the troubleshooting switch 806, which is optional in one or more embodiments, the RF communication signals 805 pass through attenuation modules 708, signal splitters 707, and amplifiers 706 en route to the switching network 702. They are then passed through the configured port 116 to a signal combiner 1001 into the RF pre-amplifier 404.

Since this is in the upstream direction, the RF pre-amplifier 404 works as an amplifier and amplifies the RF communication signals 805. Amplified RF communication signals 1005 are then delivered to the bidirectional port 121 for communication with upstream devices.

Figure 11:
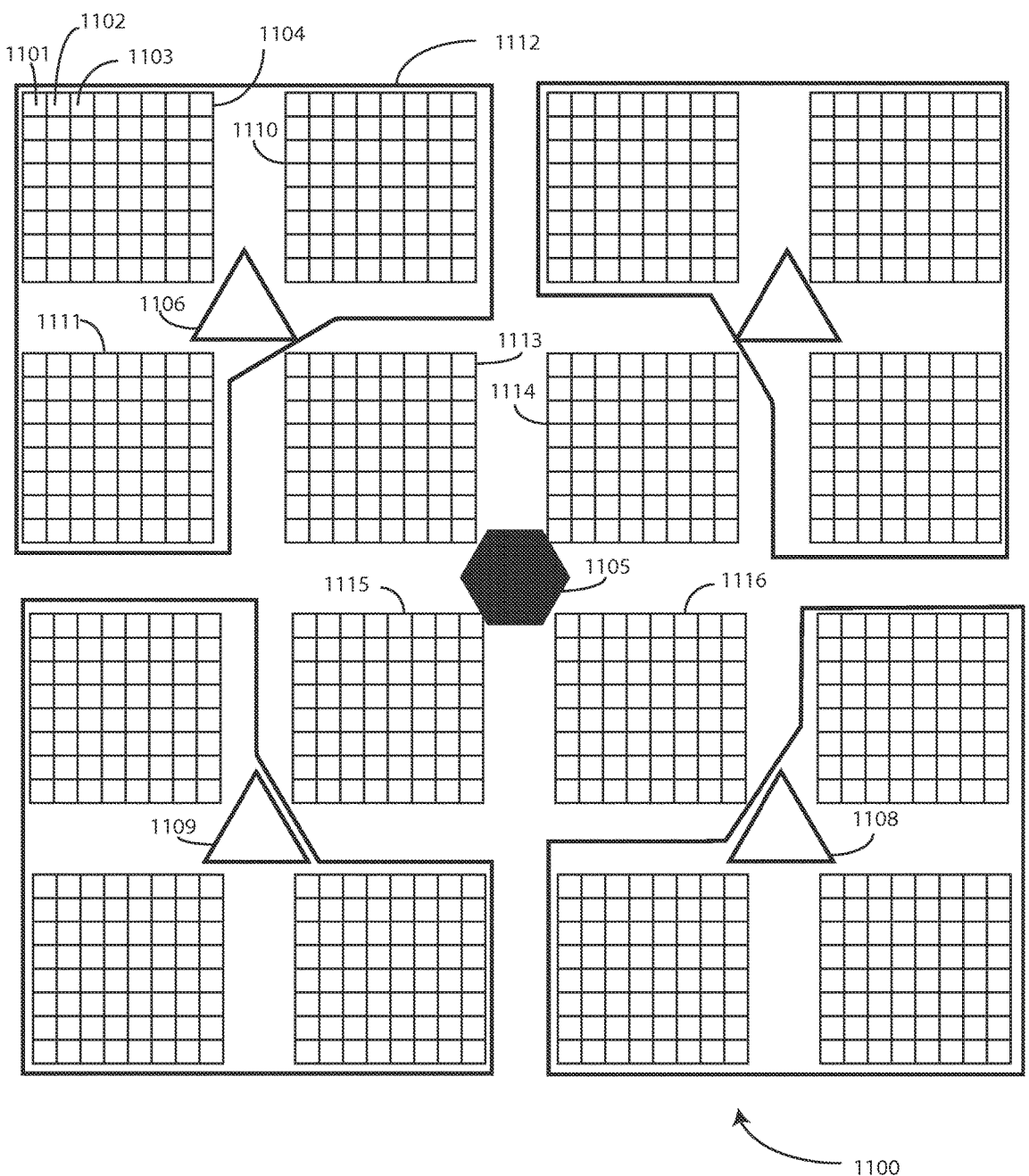
FIG. 11 illustrates a prior art system topology.
Figure 12:
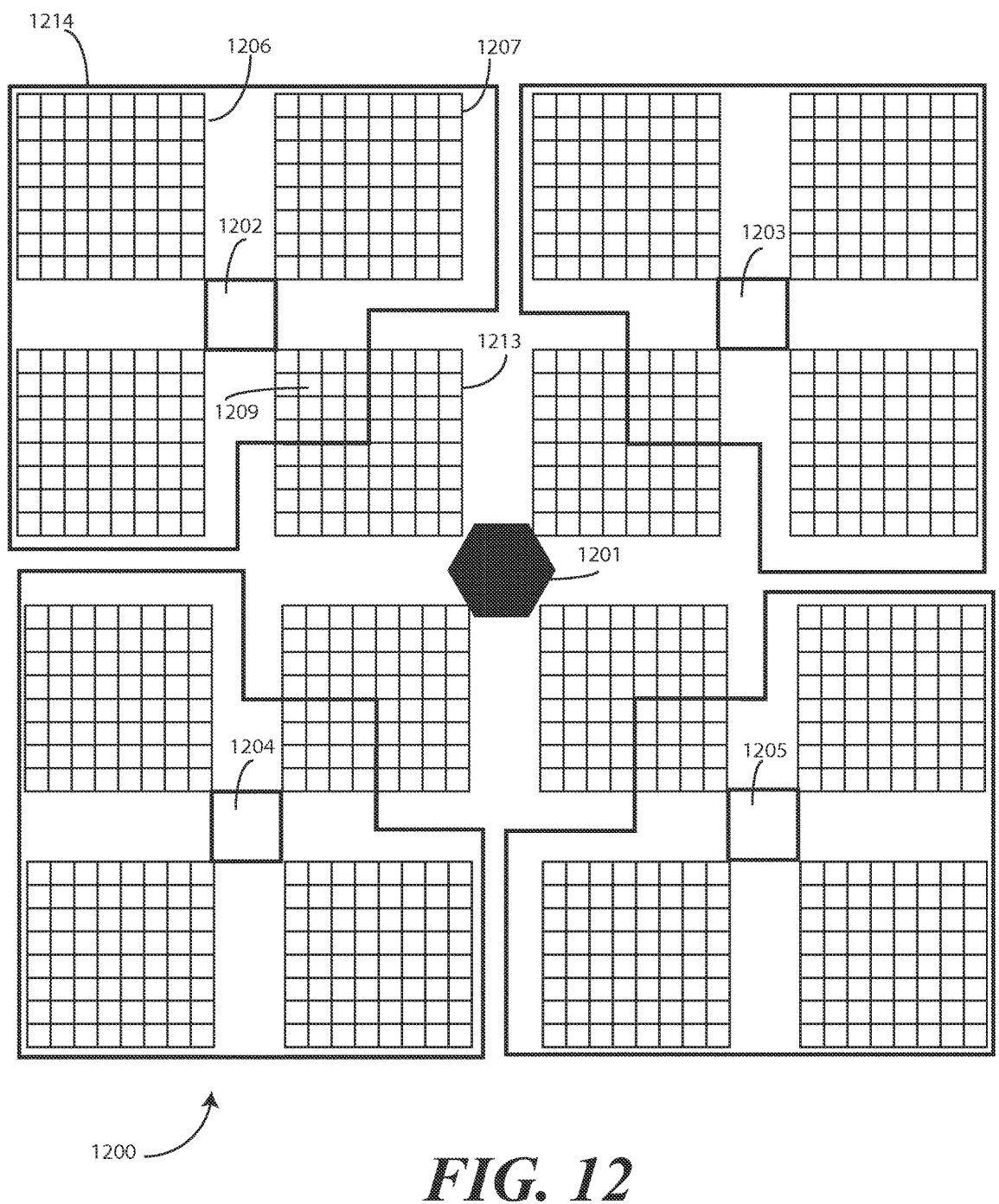
FIG. 12 illustrates one explanatory system topology in accordance with one or more embodiments of the disclosure.
Figure 13:
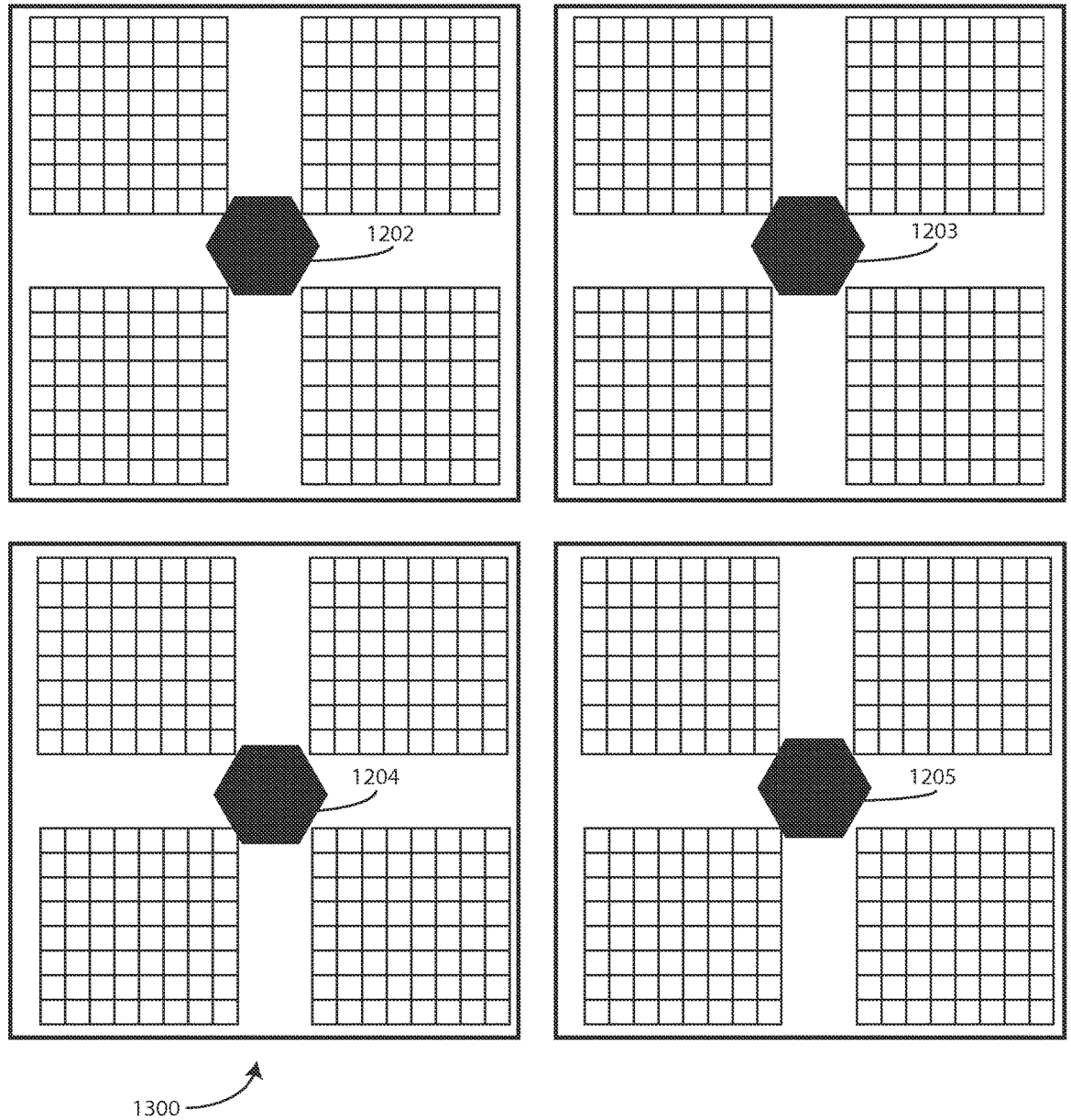
FIG. 13 illustrates another explanatory system topology in accordance with one or more embodiments of the disclosure.

Turning now to FIGS. 11-13, illustrated therein are various HFC systems. FIG. 11 illustrates a system 1100 configured in accordance with prior art components, while FIGS. 12-13 illustrate systems 1200, 1300 configured in accordance with one or more embodiments of the disclosure.

Beginning with FIG. 11, each box 1101, 1102, 1103 of the grid regions represents a client device, which serves as a network-terminating device. For example, the client device could be a set-top box, a cable modem, or other electronic device. As shown in FIG. 11, there are 64 client devices in each grid 1104, for a total of 1024 client devices. Delivering data to, or receiving data from, a client device constitutes a HHP.

The system 1100 of FIG. 11 is a "node plus one" system. This means that a node 1105 feeds four amplifiers 1106, 1107, 1108, 1109. In most prior art systems 1100, more than one amplifier would be used. Thus, a more realistic configuration would be a "node plus four" or a "node plus ten." The node plus one is shown for illustration purposes.

Each prior art amplifier 1106, 1107, 1108, 1109 has only three outputs. Accordingly, each amplifier 1106, 1107, 1108, 1109 can only serve three grids with satisfactory quality of service. For example, amplifier 1106 serves grids 1104, 1110, 1111 as indicated by boundary 1112. The node 1105, which is a much more expensive component, serves the amplifiers 1106, 1107, 1108, 1109 and central grids 1113, 1114, 1115, 1116 of the system 1100.

When the operator of the system 1100 wants to push fiber optic communication deeper into the system, they must hire a highly skilled technician essentially remove all the "guts" of each amplifier 1106, 1107, 1108, 1109 and replace nearly every component with optical node components. As noted above, sometimes only the outer housing of the original RF amplifier is all that remains. Placing technicians in the field who are capable of building optical node modules from scratch can be more costly than simply replacing the entire device.

Even where the operator is willing to retain such highly skilled technicians and to sustain such high costs, reconfigured amplifiers 1106, 1107, 1108, 1109 still have only three outputs. Thus, even after its expensive reconfiguration, node, i.e., former amplifier 1106, can only serve grids 1104, 1110, 1111 as indicated by boundary 1112.

Turning now to FIG. 12, illustrated therein is a system 1200 employing modules 100 configured in accordance with one or more embodiments of the disclosure. Module 1201 is in the default configuration operating as an optical node module, while modules 1202, 1203, 1204, 1205 are preconfigured to RF amplifiers by replacing one or more optical transmitter modules or receiver modules with a RF pre-amplifier module. Each module 1201, 1202, 1203, 1204, 1205 includes a bridger module having one upstream port and four active downstream ports as previously described.

When functioning in the node plus one configuration, having four active output ports provides a distinct advantage over the prior art system (1100) of FIG. 11. Using module 1202 as an example, this module 1202 can serve more HHP due to its additional active output. Accordingly, module 1202 can serve not only grids 1206, 1207, 1208, but also a portion 1209 of grid 1213 as indicated by boundary 1214. This reduces the load on module 1201.

The second advantage is shown in FIG. 13. In FIG. 13, the operator of system (1200) has reconfigured modules 1202, 1203, 1204, 1205 the default configuration operating as an optical node module. In one embodiment, this includes removing an RF pre-amplifier module, thereby opening an RF signal path, and recoupling the one or more optical transmitter modules or receiver modules to the four active downstream ports. This results in two benefits: First, the resulting system 1300 includes only nodes. There are no amplifiers in this system 1300. The system 1300 is thus a "node plus zero" system, which results in maximum penetration of fiber optic communications. Second, module (1201) can be removed from the system and repurposed to other networks. This is true because each module 1202, 1203, 1204, 1205 is capable of serving four grids due to its use of four outputs.

It is well to note the cost savings of pre-configuring modules 1202, 1203, 1204, 1205 to RF amplifiers and returning them to optical node modules as compared to replacing each amplifier (1106, 1107, 1108, 1109) from FIG. 11. Experimental research has shown that the modules 1202, 1203, 1204, 1205 can be deployed initially for only a small incremental increase in cost over the cost of conventional amplifier modules. However, when the extremely low cost of later returning the modules 1202, 1203, 1204, 1205 to the default configuration is compared to replacing amplifiers (1106, 1107, 1108, 1109) with nodes, a thirty-five percent (or more) cost savings can be realized by the operator. This is in addition to the increased bandwidth and quality of service offered by the node plus zero configuration of FIG. 13. Moreover, each module 1202, 1203, 1204, 1205 can be segmented from 1×4 to 2×2 or 4×4 configurations simply with little cost as noted above.

Figure 14:
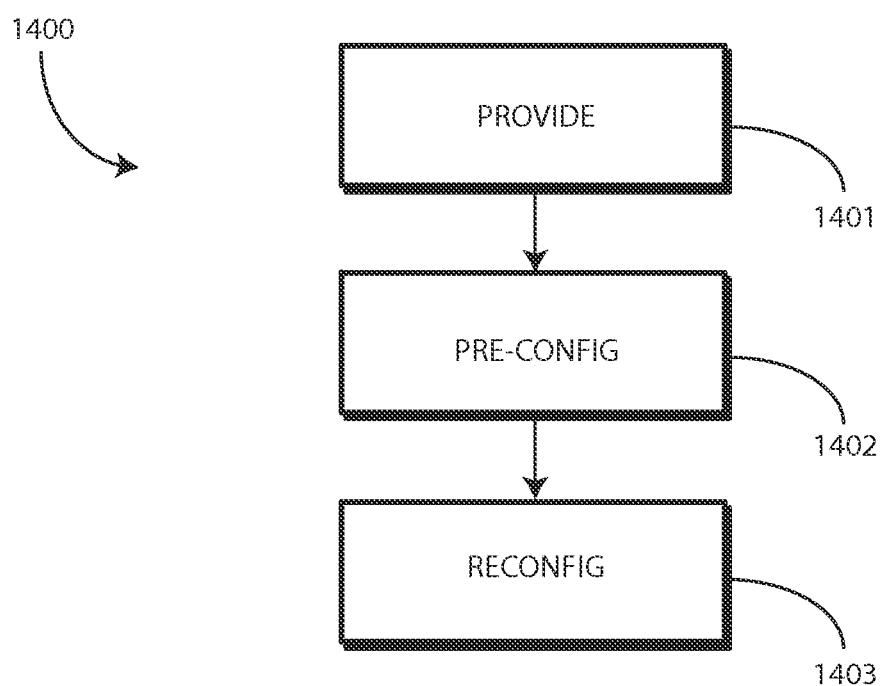
FIG. 14 illustrates an explanatory method in accordance with one or more embodiments of the disclosure.

Turning now to FIG. 14, illustrated therein is a method 1400 suitable for a HFC in accordance with one or more embodiments of the disclosure. At step 1401, the method 1400 provides an optical node module. At step 1402, the method 1400 pre-configures the optical node module to a RF amplifier. In one embodiment, the RF amplifier comprises one upstream port and four active downstream ports. In one embodiment, step 1402 comprises replacing one or more optical components with a RF pre-amplifier. In another embodiment, step 1402 comprises replacing one or more optical transmitter modules or receiver modules with a RF pre-amplifier module, where the RF pre-amplifier module is coupled between the one upstream port and the four active downstream ports to define an RF signal path between the one upstream port and the four active downstream ports.

At step 1403, the method 1400 reconfigures the optical node module provided at step 1401 to the optical node module default configuration. In one embodiment, step 1403 occurs after step 1401.

In one embodiment, step 1403 comprises removing the RF pre-amplifier module, thereby opening the RF signal path and recoupling the one or more optical transmitter modules or receiver modules to the four active downstream ports. In one embodiment, step 1403 comprises coupling one optical transmitter module and one optical receiver module to the four active downstream ports to define a 1×4 optical node module. In another embodiment, coupling a first optical transmitter and a first optical receiver to a first two active downstream ports of the four active downstream ports, and coupling a second optical transmitter and a second optical receiver to a second two active downstream ports of the four active downstream ports to define a 2×2 optical node module.

Figure 15:
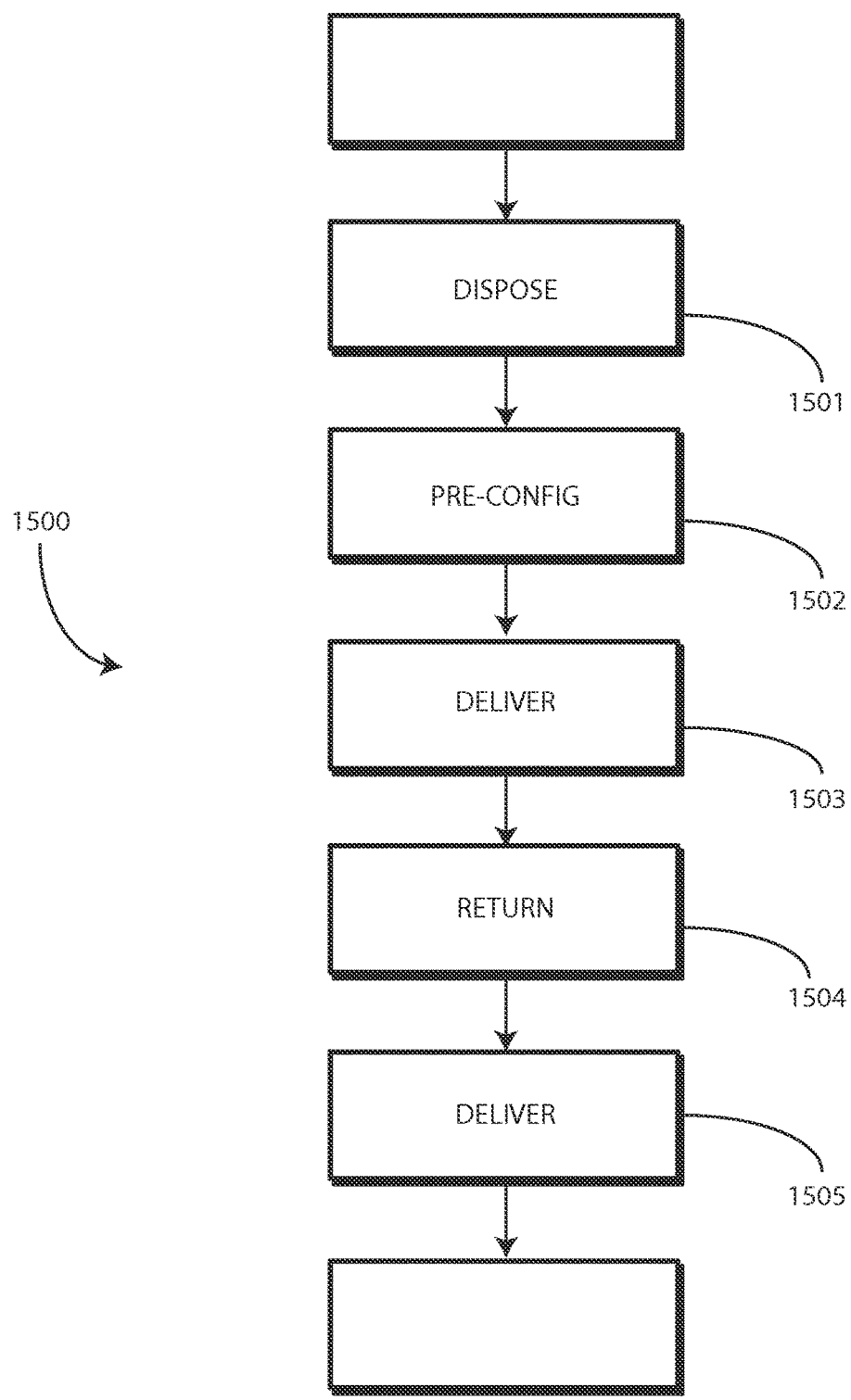
FIG. 15 illustrates another explanatory method in accordance with one or more embodiments of the disclosure.

Turning now to FIG. 15, illustrated therein is a method 1500 suitable for use in a HFC system. For example, the method 1500 of FIG. 15 could be used to achieve the systems (1200, 1300) of FIGS. 12 and 13.

At step 1501, the method 1500 disposes one or more optical node modules between an optical node module and one or more client devices, much the same way modules (1202, 1203, 1204, 1205) were disposed between module (1201) and the client devices in FIG. 12. In one embodiment, each optical node module comprises a bridger module, the bridger module comprising an upstream port, four downstream ports, and a configuration port. At step 1502, the method 1500 pre-configures at least one optical node module of the one or more optical node modules to a 1×4 radio frequency (RF) amplifier (also done in FIG. 12).

At step 1503, the method 1500 delivers downstream RF signals to the at least one optical node module pre-configured in step 1502. In one embodiment, step 1503 occurs after step 1502.

At step 1504, the method 1500 returns the at least one optical node module to a default configuration. In one embodiment, the default configuration achieved at step 1504 is one of a 1×4 optical node module, a 2×2 optical node module, or a 4×4 optical node module. At step 1505, the method 1500 delivers downstream optical signals to the at least one optical node module. In one embodiment, step 1505 occurs after step 1504.

In one embodiment, step 1505 further includes converting the downstream optical signals to RF signals delivering the RF signals to directly the one or more client devices without the RF signals passing through an intermediate RF amplifier. This occurred in the node plus zero configuration of FIG. 13. There were only nodes in the system, and there were no amplifiers whatsoever. Accordingly, RF signals were delivered from nodes to one or more client devices without passing through any intermediate RF amplifier whatsoever. This ability is one of the many advantages offered by embodiments of the disclosure. Others, in addition to the others noted above, will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for connecting a device, configurable between a radio frequency (RF) amplifier configuration and an optical node configuration, in a hybrid fiber coax (HFC) system, the method comprising:
connecting the device to one or more coaxial cables via one or more coaxial cable entry points on a device housing for operation in the radio frequency (RF) amplifier configuration in both an upstream direction between the device and a headend and a downstream direction between the device and a customer premises,
connecting the device in the HFC system to at least one fiber link via one or more fiber entry points on the device housing for operation in the optical node configuration for optical communication at least in the upstream direction toward the headend, wherein at least one of a connection to one or more of the coaxial cables or one or more of the fiber links is used for communication in the optical node configuration,
wherein said device includes:
a housing having both one or more fiber entry points and one or more coaxial cable entry points for connecting in the HFC system in either the RF amplifier configuration or the optical node configuration;
a power supply connection within said housing;
a location within the housing for interchanging between a) one or more optical transmitter modules or receiver modules for operation in the optical node configuration and b) a RF pre-amplifier for operation in the RF configuration;
a control board that is connectable to either a) the one or more optical transmitter modules or receiver modules in the optical node configuration or b) the RF pre-amplifier in the RF amplifier configuration,
wherein when the control board is connected to the one or more optical transmitter modules or receiver modules, the device is operable as an optical node module, and when the configured port is connected to the RF pre-amplifier, the device is operable as an RF amplifier; and
configuring the device having fully functional optical node capabilities in the HFC system to operate first in the field in the RF amplifier configuration with the control board connected to the RF pre-amplifier, wherein the device is configurable between the optical node configuration and the RF amplifier configuration to operate in an alternative in the field.

2. The method of claim 1, further comprising pre-configuring the device for the RF amplifier configuration by replacing one or more optical components with an RF pre-amplifier.

3. The method of claim 1, further comprising pre-configuring the device for the RF configuration by replacing one or more optical transmitter modules or receiver modules with an RF pre-amplifier module, coupling the RF pre-amplifier between one port and four active ports on the device to define an RF signal path between the one port and the four active ports.

4. The method of claim 3, further comprising reconfiguring the device from the RF configuration to the optical node configuration by:
removing the RF pre-amplifier module, thereby opening the RF signal path; and
recoupling the one or more optical transmitter modules or receiver modules to the four active ports.

5. The method of claim 4, the recoupling comprising coupling one optical transmitter module and one optical receiver module to the four active ports to define a 1×4 optical node module.

6. The method of claim 4, the recoupling comprising:
coupling a first optical transmitter and a first optical receiver to a first two active ports of the four active ports;
coupling a second optical transmitter and a second optical receiver to a second two active ports of the four active ports;
thereby defining a 2×2 optical node module.

7. The method of claim 4, the removing and the recoupling occurring after the pre-configuring.

8. A module for a hybrid fiber coax network that is configurable between an RF amplifier configuration and an optical node configuration, the module comprising:
a housing having one or more fiber entry points and one or more coaxial cable entry points for connecting in the HFC system in either the RF amplifier configuration or the optical node configuration;
at least one port connectable to one or more coaxial cables via the one or more coaxial cable entry points for RF communication to and from the module;
at least one port connectable to one or more fiber links via the one or more fiber entry points in the housing for optical communication to and from the module;

a configured port for operation in either the RF amplifier configuration or the optical node configuration;
a power supply connection with said housing;
a location within the housing for interchanging connection to a control board between a) one or more optical transmitter modules or receiver modules and b) an RF pre-amplifier;
the control board that is connectable to either a) the one or more optical transmitter modules or receiver modules in the optical node configuration or b) the RF pre-amplifier in the RF amplifier configuration,
the configured port to couple to the radio frequency (RF) pre-amplifier in the RF amplifier configuration or one or more of the optical transmitter modules or receiver modules in the optical node configuration;
wherein when the module communicates over at least one fiber link in the upstream direction and the configured port is coupled to the one or more optical transmitter modules or receiver modules for RF communication in a downstream direction, the module is operable as an optical node module; and
wherein when the module communicates over at least one coaxial cable in the upstream direction and the configured port is coupled to the RF pre-amplifier for RF communication in the downstream direction, the module is transformed to be operable as an RF amplifier.

9. The module of claim 8, wherein when the configured port is coupled to the RF pre-amplifier, an RF signal path is defined between a port for communication with upstream devices and four ports for communication with downstream devices of the bridger module to define a 1×4 RF amplifier configuration.

10. The module of claim 9, wherein when the module is in a default configuration, the RF signal path is open.

11. The module of claim 8, each optical transmitter module or receiver module comprising an optical port for communication with upstream devices.

12. The module of claim 11, wherein the module includes four ports for communication with downstream devices each comprising an active RF port.

13. The module of claim 8, wherein the housing further comprises a first portion and a second portion, a quad-output amplifier module disposed in the first portion having the at least one ports, the second portion defining a receiver to receive the one of the RF pre-amplifier or the one or more optical transmitter modules or receiver modules disposed in the second portion.

14. The module of claim 13, the first portion comprising a base of the housing, the second portion defining a lid of the housing.

15. The module of claim 8, a quad-output amplifier module having the at least one ports and further comprising one or more segmentation switches to transition the bridger module between at least a 1×4 optical node module configuration and a 2×2 optical node module configuration when the module is in the default configuration.

16. The module of claim 8, the RF pre-amplifier operable as both a forward RF pre-amplifier and a reverse RF amplifier.

17. A method in a hybrid fiber coax system, comprising:
disposing one or more optical node modules between an optical node module and one or more client devices, each optical node module comprising a quad-output amplifier module comprising:
four ports for communication with upstream devices,
four ports for communication with downstream devices, and
a configured port;
pre-configuring at least one optical node module of the one or more optical node modules to a 1×4 radio frequency (RF) amplifier; and
delivering forward RF signals to the at least one optical node module after the pre-configuring.

18. The method of claim 17, further comprising:
returning the at least one optical node module to a default configuration, the default configuration one of a 1×4 optical node module, a 2×2 optical node module, or a 4×4 optical node module; and
delivering reverse optical signals to the at least one optical node module after the returning.

19. The method of claim 18, further comprising:
converting the forward optical signals to RF signals; and
delivering the RF signals to directly the one or more client devices without the RF signals passing through an intermediate RF amplifier.

* * * * *